May 6, 1958 C. K. SITTERLY Re. 24,470
LOCKING DEVICE
Original Filed April 22, 1954
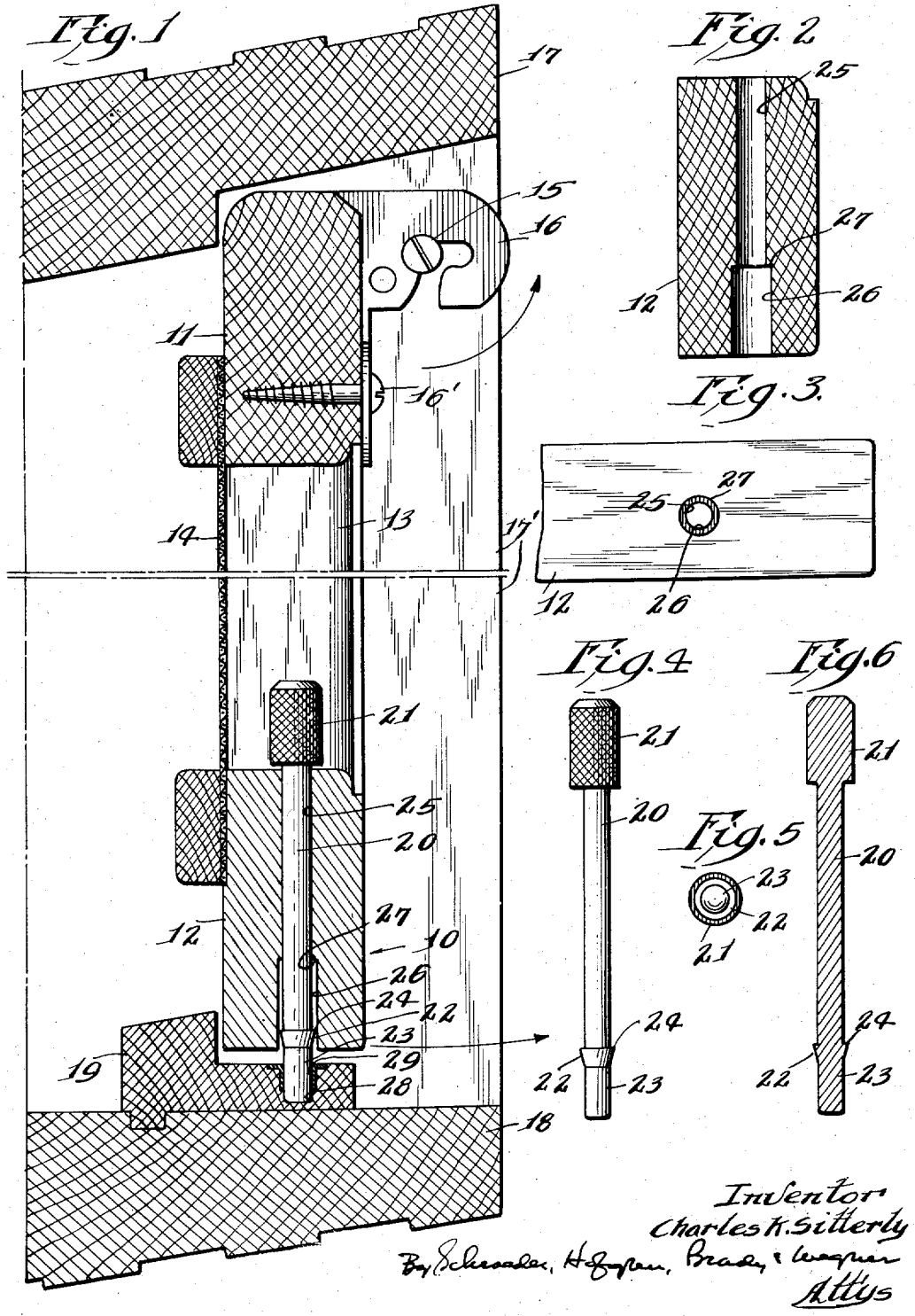

United States Patent Office

Re. 24,470
Reissued May 6, 1958

24,470

LOCKING DEVICE

Charles K. Sitterly, Dubuque, Iowa, assignor to Carr, Adams & Collier, Inc., a corporation of Iowa Original No. 2,759,746, dated August 21, 1956, Serial No. 424,868, April 22, 1954. Application for reissue August 5, 1957, Serial No. 677,188

2 Claims. (Cl. 292—145)

Matter enclosed in heavy brackets [ ] appears in the original patent but forms no part of this reissue specification; matter printed in italics indicates the additions made by reissue.

This invention relates to a locking device for windows and the like.

It is the general object of this invention to provide a new and improved locking device which is economical to manufacture and easy to install for use with screens, windows, doors or any construction wherein it is desirous to releasably lock a movable member in a fixed relation to another member.

Another object of the invention is to provide a bolt type locking device for securing a movable window or screen frame in position, which device is of one-piece construction adapted to be simply inserted into a prepared bore in the frame after which the bolt by reason of its structure is retained in the frame.

Another object is to provide a new and improved locking device for use with a hinged window screen or the like having a wooden rail member and a stationary sill member and embodying a bolt receiving bore extending transversely through the rail member and having an enlarged portion at the side adjacent the sill so as to form an annular shoulder in the bore, a bolt receiving recess in the sill member aligned with the bore when the screen is closed, and a locking bolt of one-piece construction extending through the bore and comprising a stem of substantially the same diameter as the smaller portion of said bore and slidable therein, a knob on the inner end of the stem of a diameter sufficiently large that the knob cannot pass through the bore and a rigid collar ground on the stem in a position to reciprocate in the enlarged portion of the bore, the collar being generally conical in form and forming a shoulder around the stem facing towards the annular shoulder in the bore and operable to engage the bore shoulder to block withdrawal of the pin after insertion, the pin being permanently slidably positioned within the bore by insertion from the inner side of the rail and pressing of the collar through the bore until the collar is freely slidable in the larger part of the bore, the collar acting to temporarily spread a portion of the wood around the smaller part of the bore as it passes therethrough.

Further objects and advantages will become apparent from the following detailed description taken in connection with the accompanying drawings in which:

Fig. 1 is a fragmentary vertical section illustrating the preferred form of the invention in use with a window screen construction;

Fig. 2 is a fragmentary vertical section of the lower rail of the screen frame of Fig. 1 taken through the locking bolt receiving bore;

Fig. 3 is a fragmentary bottom view of the portion of the lower rail shown in Fig. 2;

Fig. 4 is a side elevation of the preferred form of the locking bolt;

Fig. 5 is a plan view looking at the lower end of the locking bolt of Fig. 4; and Fig. 6 is a central sectional view through the locking bolt of Fig. 4.

While this invention is susceptible of embodiments in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claim.

In the preferred form of the invention shown in Fig. 1, a locking device, generally designated 10, is shown associated with a conventional wooden window screen, comprising a frame having an upper rail 11, a lower rail 12, a pair of stiles 13 (of which one is shown) and a screening 14. The screen frame is shown swingably supported on a stationary frame comprising a head jamb 17, a lower jamb 18, a sill 19, and a pair of side jambs 17' (of which one is shown). Hook devices 16 (one of which is shown) are secured to the screen frame by screws 16' and hang on pivots formed by screws 15 in the side jambs.

As best illustrated in Figs. 1 and 4, the locking device comprises, a one-piece locking bolt having a cylindrical stem 20 slidable snugly in the smaller end 25 of a bore extending transversely through the member 12. The bolt is provided with an enlarged portion forming a knurled knob 21 on the inner end of the stem of a diameter sufficiently large so that the knob cannot pass through the bore.

A rigid upset conical collar 22 is formed on the stem in a spaced relation from the knob and a catch-engaging outer end 23 of the stem extending beyond the collar. The collar is in a position to reciprocate in an enlarged portion 26 of the bore opening at the side of the rail adjacent the sill and forming an annular shoulder 27 in the bore. The collar extends from the periphery of the stem in a gradual, outward taper toward the knob end of the stem to form a shoulder 24 around the stem facing towards the annular shoulder in the bore and operable to engage the bore shoulder to block withdrawal of the bolt after insertion. A catch comprising a recess 28 is provided in the sill 19 in vertical alignment with the bore when the screen is in locking position with the sill and may be furnished with a metal sleeve 29 if desired.

The bolt may be cast or machined from a single piece of stock as the knob, stem and collar may be of one-piece construction because the only assembly operation required is insertion of the bolt in the bore. In assembly of the device, end 23 of the stem is inserted in the smaller portion 25 of the bore and the associated collar 22 forced therethrough until it is freely slidable in enlarged bore portion 26. During this operation, the collar 22, because of its gradual taper outwardly and upwardly from the direction of insertion and a slightly larger diameter than the smaller bore portion, functions to wedge through the bore and temporarily spread, a portion of the wood around bore 25 which, due to the resiliency of the wood, substantially reforms after passage of the collar, leaving bore 25 snugly receiving the stem 20 and retaining a diameter less than that of the collar shoulder. After such insertion the annular bore shoulder 27 is engageable with the collar shoulder to prevent retraction of the bolt and the knob is engageable against the lower rail to prevent withdrawal in the direction of insertion. Thus, it is apparent that once the locking bolt has been inserted in the bore it will remain permanently confined therein, and slidable between a withdrawn position when the collar engages the bore shoulder allowing the screen frame to swing across the sill and a lock position wherein the catch end 23 of the stem engages the recess 28 to lock the screen frame to the sill.

What I claim is:

*1.* A [a] selectively fastenable movable window unit comprising in combination; a window unit frame member of wood construction, means defining a transverse bore through the member, said bore having a pair of different diameter portions, the smaller diameter portion opening to an inner side of the member and the larger diameter portion opening to an outer side with a shoulder in the bore between said portions, a one-piece locking bolt having a cylindrical stem a portion of which is slidable snugly in the smaller of said bore portions and having [the inner] *an* exposed knob on [an] *the inner* end of said stem and of a size barring passage of the knob through the bore, an annular collar of a diameter larger than said smaller bore portion on the stem spaced from the knob and outer end of the stem and freely slidable in the larger diameter portion of the bore, said collar having a conical shape tapering gradually away from the outer end of the stem to the outer periphery of said collar to permit, in assembly, wedging of the stem in one direction from the inner side of the member through the smaller of said bore portions bringing said collar into the larger of said bore portions, and said collar forming an annular abutment facing said shoulder adapted to engage the shoulder and prevent removal of the bolt from the bore.

*2. A selectively fastenable movable window unit comprising in combination; a window unit frame member formed of material such as wood or the like having resilient properties, means defining a transverse bore through the member, said bore having a pair of different diameter portions, the smaller diameter portion having a cylindrical smooth wall opening to an inner side of the member and the larger diameter portion opening to an outer side with a shoulder in the bore between said portions, a one-piece locking bolt having a cylindrical stem a portion of which is slidable snugly in the smaller cylindrical bore portion and having an exposed knob on the inner end of said stem and of a size barring passage of the knob through the bore, a substantially annular collar of a diameter larger than said smaller bore portion on the stem spaced from the knob and freely slidable in the larger diameter portion of the bore, said collar having a generally conical shape tapering gradually away from the outer end of the stem to the outer periphery of said collar to permit, in assembly, wedging of the stem in one direction from the inner side of the member through the smaller cylindrical bore portion bringing said collar into the larger of said bore portions, and said collar forming an annular abutment facing said shoulder adapted to engage the shoulder and prevent removal of the bolt from the bore.*

References Cited in the file of this patent or the original patent

UNITED STATES PATENTS

| | | |
|---|---|---|
| 1,113,946 | Barton | Oct. 20, 1914 |
| 1,200,594 | Curtis | Oct. 10, 1916 |
| 2,020,062 | Jackson | Nov. 5, 1935 |
| 2,477,524 | Oswald et al. | July 26, 1949 |

FOREIGN PATENTS

| | | |
|---|---|---|
| 355,514 | Great Britain | Aug. 27, 1931 |